US009696861B2

United States Patent
Dinu et al.

(10) Patent No.: US 9,696,861 B2
(45) Date of Patent: Jul. 4, 2017

(54) TOUCH REJECTION FOR COMMUNICATION BETWEEN A TOUCH SCREEN DEVICE AND AN ACTIVE STYLUS

(71) Applicant: STMicroelectronics Asia Pacific Pte Ltd, Singapore (SG)

(72) Inventors: Leonard Dinu, Singapore (SG); Eng Jye Ng, Singapore (SG); Kien Beng Tan, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 73 days.

(21) Appl. No.: 14/641,717

(22) Filed: Mar. 9, 2015

(65) Prior Publication Data

US 2016/0266673 A1    Sep. 15, 2016

(51) Int. Cl.
*G06F 3/044*    (2006.01)
*G06F 3/041*    (2006.01)

(52) U.S. Cl.
CPC ............ *G06F 3/044* (2013.01); *G06F 3/0416* (2013.01)

(58) Field of Classification Search
CPC ............................. G06F 3/03545; G06F 3/044
See application file for complete search history.

(56) References Cited

U.S. PATENT DOCUMENTS

| 9,430,085 B2* | 8/2016 | Durojaiye ............... G06F 3/041 |
| 2011/0122087 A1* | 5/2011 | Jang ....................... G06F 3/044 345/174 |
| 2012/0105361 A1 | 5/2012 | Kremin et al. |
| 2012/0262407 A1 | 10/2012 | Hinckley et al. |
| 2013/0300672 A1* | 11/2013 | Griffin ................ G06F 3/04883 345/173 |
| 2013/0300696 A1* | 11/2013 | Haran ..................... G06F 3/041 345/173 |
| 2013/0321295 A1* | 12/2013 | Lin ....................... G06F 3/0416 345/173 |
| 2013/0328810 A1 | 12/2013 | Li et al. |
| 2014/0306912 A1 | 10/2014 | Woolley |

* cited by examiner

*Primary Examiner* — Benjamin C Lee
*Assistant Examiner* — Xuemei Zheng
(74) *Attorney, Agent, or Firm* — Gardere Wynne Sewell LLP

(57) ABSTRACT

A touch panel includes capacitive sensing electrodes and a touch controller operates in a first operating mode to detect a touch location on the touch panel. In a second operating mode, the touch controller transmits a modulated data signal through the touch panel to an active stylus. Each electrode is driven by a line driver circuit. A control circuit selectively actuates first ones of the line driver circuits to pass the modulated data signal to corresponding first ones of the electrodes which do not pass through a region of the touch panel associated with the location of the detected touch. Simultaneously, the control circuit selectively actuates second ones of the line driver circuits, different from said first ones of the line driver circuits, to ground corresponding second ones of the electrodes which do pass through the region of the touch panel associated with the location of the detected touch.

25 Claims, 4 Drawing Sheets

TOUCH REJECTION FOR COMMUNICATION BETWEEN A TOUCH SCREEN DEVICE AND AN ACTIVE STYLUS

TECHNICAL FIELD

The present invention relates to a touch screen system which includes an active stylus and, in particular, to a circuit and process for touch (for example, palm) rejection in connection with the sending of a data communication from a touch screen device to the active stylus.

BACKGROUND

FIG. 1 illustrates a user interaction in a touch screen system 10 which includes a touch screen device 12 and an active stylus 14. The touch screen system 10 further includes a touch screen controller (TSC) 16 which functions in a number of modes including a capacitive sensing mode to detect a touch made to the touch screen device by a user through either, or both, a body part of the user or the active stylus 14 being manipulated by the user. The touch screen controller 16 is operable in another mode to engage in bi-directional data communications with the active stylus 14 through the touch screen device 12.

The hand of the user may grab the touch screen device 12 as generally indicated at reference 18. Still further, the hand of the user may rest on the surface of the touch screen device 12 while manipulating the active stylus 14 as generally indicated at reference 20. The user's hand/finger/thumb and the active stylus 14 are grounded through a common ground connection using the user's body (represented by the capacitance Cb). The touch screen controller 16, on the other hand, has its own grounding connection (represented by the capacitance Ctsc) which is different from the grounding of the body. This difference in grounding can cause signal attenuation problems when the touch screen controller 16 is operating in a transmit data communication mode to send a data communications signal to the active stylus 14. In this operating mode, the signal transmitted by the touch screen controller 16 through the touch screen device 12 will be picked up by both the active stylus 14 and the body of the user (through the surface touches referenced at 18 and/or 20). Because the user's body is also providing the ground reference for the active stylus 14, the actual signal which is received by the active stylus itself will be attenuated. Indeed, the attenuation may be so severe that it precludes accurate detection of the data communication information being transmitted to the active stylus 14.

There is accordingly a need in the art for a way to detect a user touch and control operation of the touch screen system to mitigate the adverse effects of such a touch when transmitting a data communication from the touch screen device to the active stylus.

SUMMARY

In an embodiment, a system comprises: a touch panel including plural first electrodes and plural second electrodes, wherein the first and second electrodes cross over each other; and a touch controller circuit configured in a first mode to detect a location of a touch made to the touch panel and in a second mode to transmit a modulated data signal through the touch panel to an active stylus device. The touch controller circuit comprises: a line driver circuit for each first and second electrode; and a transmit multiplexer coupled to each line driver circuit configured to operate in the second mode to: selectively cause first ones of the line driver circuits to pass the modulated data signal through the first and second electrodes that are connected to outputs of said first ones of the line driver circuits and which do not pass through a region of the touch panel associated with the location of the detected touch; and simultaneously selectively cause second ones of the line driver circuits, different from said first ones, to ground the first and second electrodes that are connected to outputs of said second ones of the line driver circuits and which do pass through the region of the touch panel associated with the location of the detected touch.

In an embodiment, a method comprises: using a touch panel including plural first electrodes and plural second electrodes, wherein the first and second electrodes cross over each other, to detect a location of a touch made to the touch panel; and using the touch panel to transmit a modulated data signal through the touch panel to an active stylus device by selectively actuating line driver circuits for each first and second electrode. The step of selectively actuating comprises: selectively causing first ones of the line driver circuits to pass the modulated data signal through the first and second electrodes that are connected to outputs of said first ones of the line driver circuits and which do not pass through a region of the touch panel associated with the location of the detected touch; and simultaneously selectively causing second ones of the line driver circuits, different from said first ones, to ground the first and second electrodes that are connected to outputs of said second ones of the line driver circuits and which do pass through the region of the touch panel associated with the location of the detected touch.

In an embodiment, a system comprises: a touch panel including a plurality of capacitive sensing electrodes; and a touch controller circuit that uses the plurality of electrodes in a first mode of operation to detect a location of a touch made to the touch panel and uses the plurality of electrodes in a second mode of operation to transmit a modulated data signal through the touch panel to an active stylus device. The touch controller circuit comprises: a line driver circuit for each electrode; and a control circuit that: selectively actuates first ones of the line driver circuits to pass the modulated data signal to corresponding first ones of the electrodes which do not pass through a region of the touch panel associated with the location of the detected touch; and simultaneously selectively actuate second ones of the line driver circuits, different from said first ones of the line driver circuits, to ground corresponding second ones of the electrodes which do pass through the region of the touch panel associated with the location of the detected touch.

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 1:
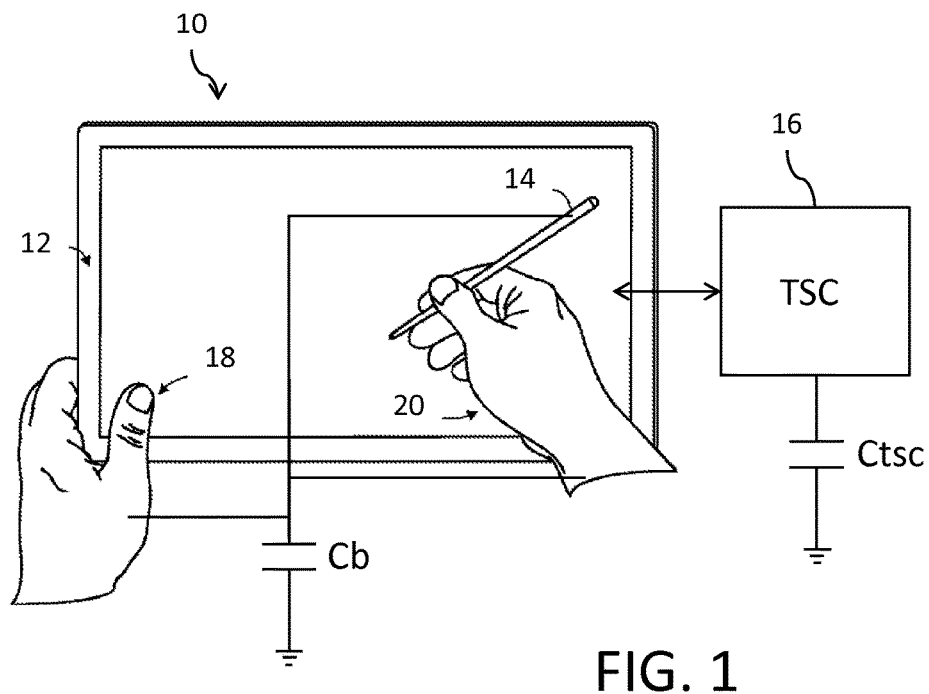
FIG. 1 illustrates a user interaction in a touch screen system.
Figure 2:
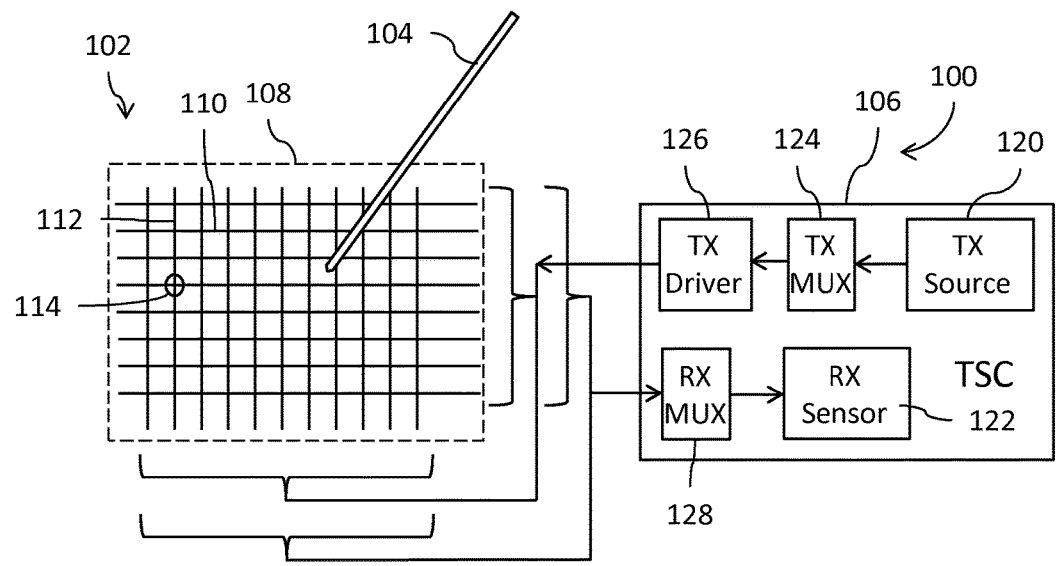
FIG. 2 is a block diagram of a touch screen system.

Reference is now made to FIG. 2 showing a block diagram of a touch screen system 100. The system 100 includes a touch screen device 102, an active stylus 104 and a touch screen controller 106.

The touch screen device 102 includes a capacitive sensing panel 108 including a plurality of electrodes arranged in rows and columns. For example, the panel 108 includes first electrodes 110 each extending in a first direction to form rows and second electrodes 112 each extending in a second direction (perpendicular to the first direction) to form columns. The first and second electrodes 110 and 112 are separated from each other (in a direction perpendicular to the planes in which the electrodes are formed) so as to provide for a capacitive coupling at each intersection location 114 where the row and column electrodes cross over each other.

The touch screen controller 106 includes a transmit signal source circuit 120 that is configured for operation to generate one or more drive signals (such as AC signals) and a receive sense circuit 122 that is configured for operation to sense capacitance at each of the locations 114. A transmit multiplexer circuit 124 has an input that is coupled to an output of the transmit signal source circuit 120. Outputs from the transmit multiplexer circuit 124 are coupled to the first and second electrodes 110 and 112 through a transmit driver circuit 126 (including one line driver circuit for each of the electrodes to be driven). Each line driver circuit may, for example, comprise a CMOS line driver circuit as known in the art. A receive multiplexer circuit 128 has inputs coupled to the first and second electrodes 110 and 112 and an output coupled to an input of the receive sense circuit 122.

In a mutual capacitance sensing operation mode, the touch screen controller 106 uses the transmit signal source circuit 120 to generate an alternating current drive signal and then controls the transmit multiplexer circuit 124 to selectively apply that drive signal in a sequential manner through the line drivers of the driver circuit 126 to each of the first electrodes 110 (which in this mode function as "force" lines). The touch screen controller 106 further controls the receive multiplexer circuit 126 to select one or more of the second electrodes 112 (which in this mode function as "sense" lines) to be coupled to the receive sense circuit 122. In this regard, the sense circuit 122 may comprise a plurality of individual sensing circuits and thus may simultaneously process signals from multiple sense lines as selected by the receive multiplexer circuit. The sense circuit 122 operates using charge accumulation, capacitance modulation or other capacitance sensing techniques known to the those skilled in the art to sense change in the capacitance of the capacitive coupling at each intersection location 114, where such change in capacitance is indicative of the sensing of the user's body part and/or the active stylus near (i.e., hovering over) or in contact with the surface of the panel 108. Using the sensed capacitance information, the touch screen controller 106 may operate to resolve the relative location and extent (size) of the sensed capacitive detection (hover/touch).

Operation of a touch screen controller in a mutual capacitance sensing mode is well known to those skilled in the art. Circuits and techniques supporting this mode of operation are also well known in the art.

The active stylus 104 has a configuration, as known to those skilled in the art, which includes a transceiver circuit that is operable in transmit mode to transmit a data communication to the touch screen device 102 and is operable in receive mode to receive a data communication from the touch screen device 102.

When operating in transmit mode, the active stylus 104 uses the transceiver circuit to generate a modulated communications signal which is received by one or more of the electrodes of the capacitive sensing panel 108 and detected by the sense circuit 122. This modulated data signal may, for example, communicate data such as sensed pressure data from the active stylus 104 for processing by a processing unit coupled to the touch screen controller 106. As an example, when the active stylus 104 is operating in transmit mode, the receive multiplexer circuit 128 selects one or more of the first and second electrodes 110 and 112 (which in this mode function as "receive" lines), with the received data communications signal passed by the touch screen controller 106 to a host processing system.

When operating in receive mode, the active stylus 104 uses the transceiver circuit to detect a modulated communications signal emitted by the capacitive sensing panel 108. This modulated data signal may, for example, comprise a wake up signal directing the active stylus to switch from a low power sleep mode to an active operation mode, or comprise a synchronization signal for synchronizing subsequent bi-directional communications between the touch screen device 102 and the active stylus 104, or comprise a data signal to communicate data such as configuration or control data to the active stylus 104. As an example, when the active stylus 104 is operating in receive mode, the transmit multiplexer circuit 124 selects one or more of the first and second electrodes 110 and 112 (which in this mode function as "transmit" lines), with the transmitted data communications signal passed from a host processing system through the touch screen controller 106.

Figure 3:
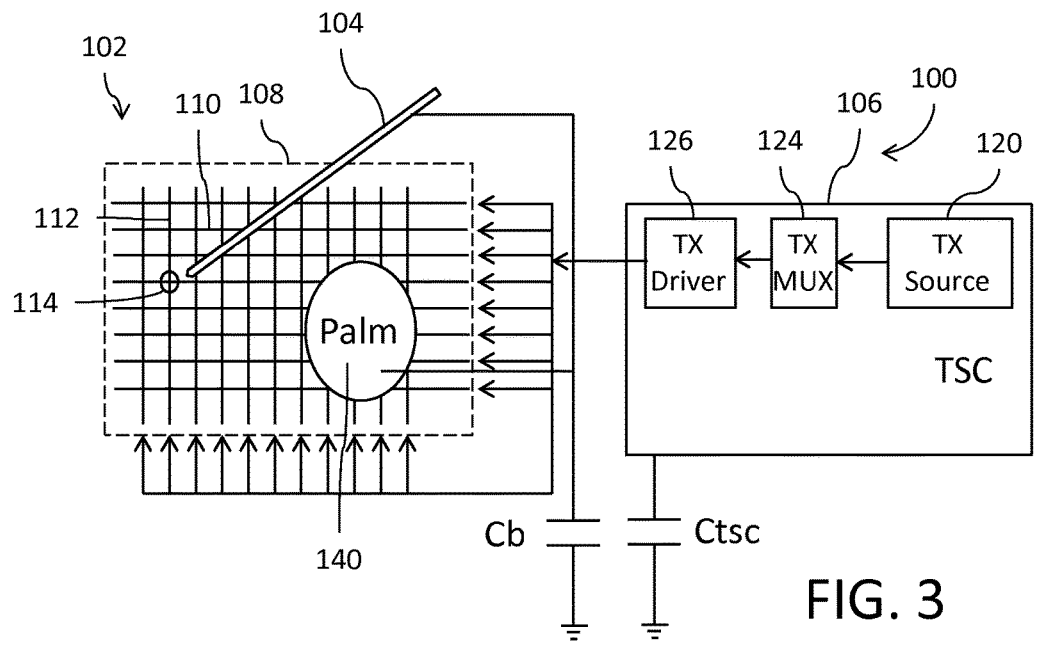
FIG. 3 illustrates system operation for transmitting a data communication message from a touch screen device to an active stylus with attenuation issues.

In an embodiment relating to the active stylus receive mode of operation, the transmit multiplexer circuit 124 may select all of the first and second electrodes 110 and 112 to transmit the modulated data communications signal. This operation is illustrated in FIG. 3. The user's palm for the hand holding the active stylus 104 is shown at reference 140 in touch contact with the panel 108. In this situation the user's hand and the active stylus 104 are grounded through a common ground connection using the user's body (represented by the capacitance Cb). The touch screen controller 106, on the other hand, has its own grounding connection (represented by the capacitance Ctsc) which is different from the grounding of the body. This difference in grounding can cause an attenuation of the modulated data signal being transmitted by the first and second electrodes 110 and 112.

Figure 4A:
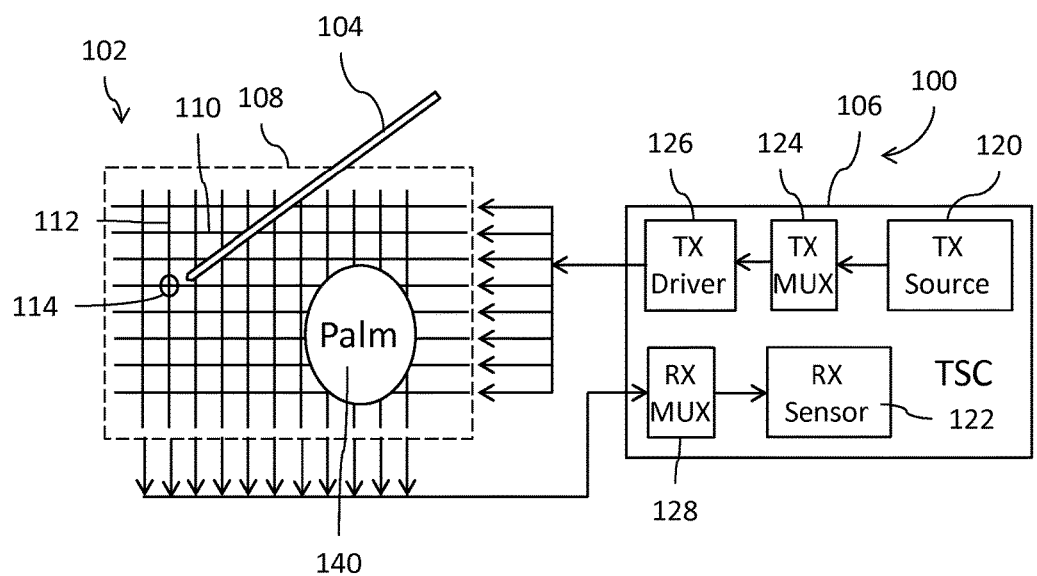
FIG. 4A illustrates system operation in a mutual capacitance mode to detect a user touch.

To address this problem, FIG. 4A shows operation of the system 100 in the mutual capacitance sensing operation mode to detect the location and extent of the palm touch 140. The touch screen controller 106 uses the transmit signal source circuit 120 to generate an alternating current drive signal and then controls the transmit multiplexer circuit 124 to selectively apply that drive signal in a sequential manner through the line drivers of the driver circuit 126 to each of the first electrodes 110 (functioning as "force" lines). The touch screen controller 106 further controls the receive multiplexer circuit 126 to select one or more of the second electrodes 112 (functioning as "sense" lines) to be coupled to the receive sense circuit 122. The receive sense circuit 122 measures change in capacitance at each of the line intersection locations 114 in order to detect the location and extent (size) of the palm touch 140.

Figure 4B:
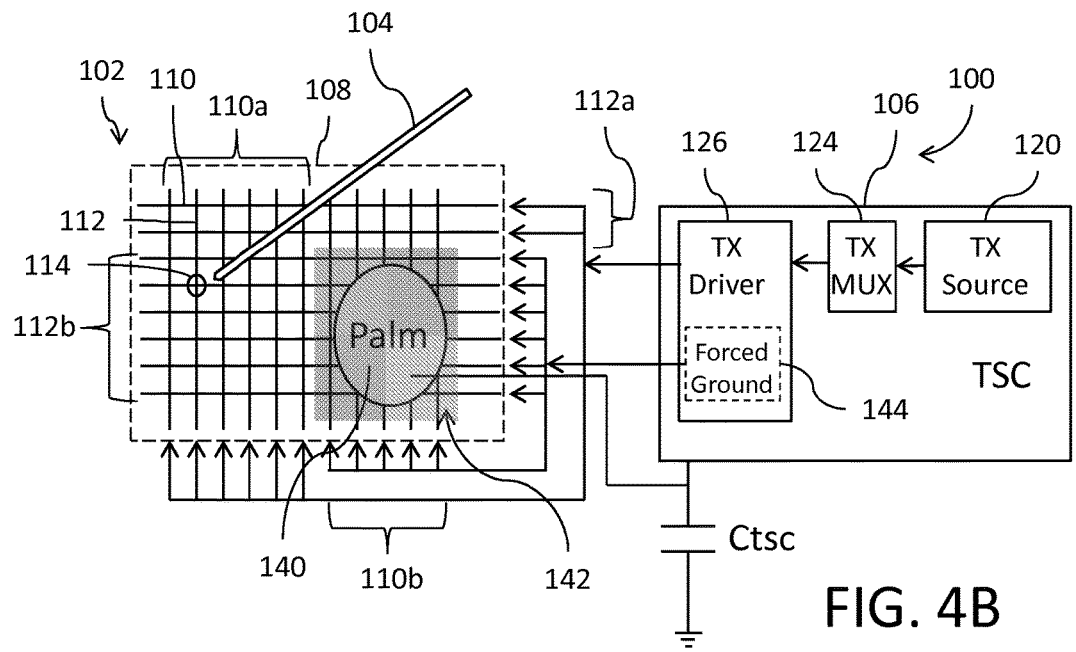
FIG. 4B illustrates system operation in a data communication message transmission mode with selected grounding of panel electrodes within a region of the detected user touch.

Once the location and extent of the palm touch 140 has been determined, operation of the system 100 transitions to the stylus communication mode of operation as shown in FIG. 4B. The touch screen controller 106 uses the transmit signal source circuit 120 to generate a modulated data signal and then controls the transmit multiplexer circuit 124 to selectively actuate the line drivers in a manner which will selectively apply that drive signal simultaneously through the line drivers of the driver circuit 126 to a reduced plurality of the first and second electrodes 110 and 112 (functioning as "transmit" lines). It will be noted, unlike the operation of FIG. 3, that not all of the first and second electrodes 110 and 112 are applied with the modulated data signal by the line drivers. Rather, only those first and second electrodes 110 and 112 which are not associated with the detected location and extent of the palm touch 140 have line drivers selected by the transmit multiplexer circuit 124 to transmit the modulated data signal. The line drivers for the other electrodes 110/112 which are associated with the detected location are not actuated to pass the data signal. A region 142 of the panel 108 for the detected palm touch 140 location is effectively blacked-out with respect to the data signal transmission operation. A forced grounding circuit 144 implemented by a selective grounding actuation of line drivers responds to transmit multiplexer circuit 124 control to selectively cause the first and second electrodes 110 and 112 which cross through the region 142 to instead be connected to a ground reference of the touch screen controller 106 for the period of time during which the modulated data signal is being transmitted by the first and second electrodes 110 and 112 not associated with the detected location (i.e., all line drivers are simultaneously actuated, but first ones of the drivers pass the modulated data signal and second ones of the drivers force the ground connection). In this case, the user's hand (through the palm touch 140) is now coupled to the same ground reference as the touch screen controller 106 (represented by the capacitance Ctsc) because the proximately located electrodes 110/112 in the region 142 are forced to that same ground reference. This creates a common reference for the transmitted modulated data signal (from the touch screen controller 106 via the electrodes of the panel 108) which can then be received with a high and consistent amplitude by the transceiver of the active stylus 104. In effect, the grounding of the electrodes in the region 142 precludes the user's hand at the palm touch 140 from coupling to the transmitted modulated data signal and attenuating the transmitted modulated data signal.

Figure 4C:
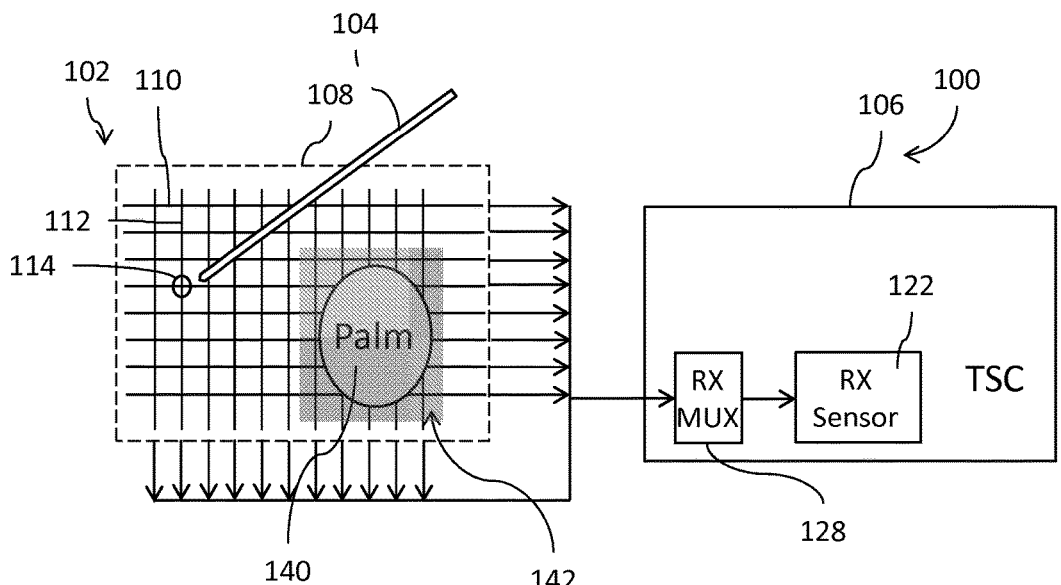
FIG. 4C illustrates further system operation in the data communication message transmission mode with selected grounding of panel electrodes within a region of the detected user touch.

After completion of the data message transmission through the panel 108 to the active stylus 104, operation switches to stylus transmission mode as shown in FIG. 4C. Using the transceiver of the active stylus 104, the stylus transmits a modulated data signal which is received by the electrodes of the panel 108. The touch screen controller 106 switches to receive mode. The receive multiplexer circuit 128 is controlled by the touch screen controller 106 to select the first and second electrodes 110 and 112 for coupling to the receive sense circuit 122. The stylus transmitted modulated data signal which is received by one of more of the electrodes is then passed by the receive multiplexer circuit 128 to the input of the receive sense circuit 122 for detection. In an embodiment, the receive multiplexer circuit 128 is controlled to first select the first electrodes 110 and then select to second electrodes 112 (or vice versa).

Figure 5A:
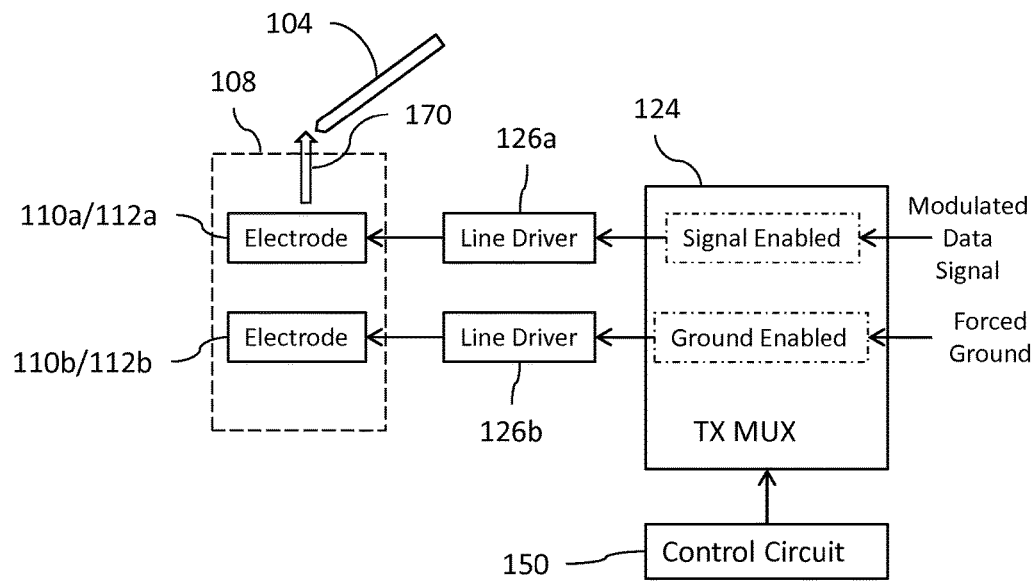
FIG. 5A is a schematic illustration for the driving of selected and non-selected electrodes during a data communication message transmission mode.

Reference is now made to FIG. 5A schematically illustrating a stylus communication mode of operation wherein a modulated data signal is transmitted 170 to the stylus (see, also FIG. 4B). Following the operation to detect the location and extent of the palm touch 140, the transmit multiplexer circuit 124 of the touch screen controller 106 is provided with an identification of the "signal enabled" electrodes 110a/112a of the panel 108 which will participate in the transmission of the modulated data signal to the active stylus 104. The transmit multiplexer circuit 124 passes the modulated data signal through to the individual line drivers 126a having outputs coupled to the "signal enabled" electrodes 110a/112a. With respect to the "ground enabled" electrodes 110b/112b of the panel 108 corresponding to the region 142 of the detected palm touch 140, the transmit multiplexer circuit 124 passes a forced ground signal through to the individual line drivers 126b. Those line drivers 126b respond to the forced ground signal by connecting the "ground enabled" electrodes 110b/112b of the panel 108 to the same ground reference of the touch screen controller 106. Operation of the transmit multiplexer circuit 124 to make a choice between "signal enabled" and "ground enabled" electrodes, and thus the control selective actuation of the line driver circuits to either pass the modulated data signal for transmission or force the ground connection, may be made by a control circuit 150 which is responsive to the detection of the touch location (see, FIG. 4A). The control circuit 150 may be a part of the touch screen controller 106 or may be another circuit such as host processing circuit which is configurable to control touch screen controller 106 operation in a manner understood by those skilled in the art.

Figure 5B:
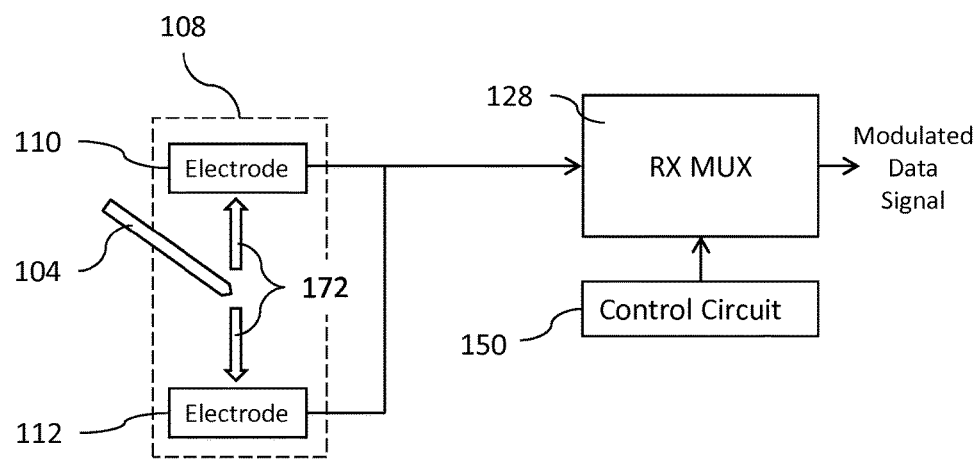
FIG. 5B is a schematic illustration for the driving of non-selected electrodes and reception using selected electrodes during a further data communication message transmission mode.

Reference is now made to FIG. 5B schematically illustrating a stylus communication mode of operation wherein a modulated data signal is transmitted 172 from the stylus (see, also FIG. 4C). The electrodes 110/112 of the panel 108 are selected by the receive multiplexer circuit 128 in response to the control circuit 150 to pass the modulated data signal generated by the active stylus 104 and received by the electrodes to the input of the receive sense circuit 122 for detection.

It will be noted that the illustration of a "palm" touch is by example only. The process disclosed herein in applicable to any touch made to the panel by user. The location and extent (size) of that touch (for example, a finger or thumb touch) will likewise be detected and then the stylus communication mode of operation (FIGS. 4B and 5) will blackout the region 142 associated with that detected touch and actuate only those electrodes 110a/112a which are outside of the region 142 for transmission of the data communications signal to the active stylus 104.

It is possible that some portion of the user's body may couple to the actuated electrodes transmitting the data communication signal. This will result in some level of attenuation of the transmitted signal. However, the forced grounding of the electrodes in the region 142 will still produce a benefit over operation absent such grounding as described in connection with FIG. 3.

In a preferred implementation, all of the "selected" electrodes 110a/112a will be simultaneously actuated by the transmit multiplexer circuit 124 to transmit the data communication signal. In another drive scenario, the "selected" electrodes 110a/112a are driven in a sequence (for example, individual electrodes are driven one by one or small groups of electrodes are driven group by group).

It is possible that the mutual capacitance mode of operation may detect multiple touches 140. In such a case, a determination is made as to the largest of the detected touch areas, and the "selected" electrodes 110a/112a are those electrodes which do not pass through that largest touch area (even if they were to pass through another detected touch area). Alternatively, depending on size and spacing of the detected plural touches, the "selected" electrodes 110a/112a may be those electrodes which do not pass through any of the detected touch areas.

The foregoing description has provided by way of exemplary and non-limiting examples for a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A system, comprising:
   a touch panel including plural first electrodes and plural second electrodes, wherein the first and second electrodes cross over each other; and
   a touch controller circuit configured to operate in a first mode to detect a location of a touch made to the touch panel and, in response to the detected location of the touch, to then operate in a second mode to transmit a modulated data signal through the touch panel to an active stylus device, the touch controller circuit comprising:
      a line driver circuit for each first and second electrode; and
      a transmit multiplexer coupled to each line driver circuit configured to operate in the second mode to:
         generate the modulated data signal for transmission to the active stylus device;
         selectively cause first ones of the line driver circuits to pass the modulated data signal through the first and second electrodes that are connected to outputs of said first ones of the line driver circuits and which do not pass through a region of the touch panel that includes the detected location of the touch; and
         simultaneously selectively cause second ones of the line driver circuits, different from said first ones, to ground the first and second electrodes that are connected to outputs of said second ones of the line driver circuits and which do pass through the region of the touch panel that includes the detected location of the touch.

2. The system of claim 1, wherein the modulated data signal is a wake-up signal.

3. The system of claim 1, wherein the modulated data signal is a synchronization signal.

4. The system of claim 1, wherein the first mode for the touch controller circuit detects change in mutual capacitance between the first and second electrodes at locations where the first and second electrodes cross over each other.

5. The system of claim 1, wherein the touch controller circuit has a ground reference and the second ones of the line driver circuits selectively ground the first and second electrodes to said ground reference of the touch controller circuit.

6. The system of claim 1, wherein the touch controller circuit is further configured to operate in a third mode to receive a modulated data signal transmitted from the active stylus device through the touch panel, the touch controller circuit comprising:
   a receive multiplexer coupled to the first and second electrodes; and
   a receive sensor circuit coupled to an output of the receive multiplexer;
   wherein the receive multiplexer is configured to operate in the third mode to select ones of the first and second electrodes to receive the modulated data signal transmitted from the active stylus device and pass the received modulated data signal to the receive sensor circuit.

7. A method, comprising:
   using a touch panel including plural first electrodes and plural second electrodes, wherein the first and second electrodes cross over each other, to detect a location of a touch made to the touch panel; and
   in response to the detected location of the touch, then using the touch panel to generate and transmit a modulated data signal through the touch panel to an active stylus device by selectively actuating line driver circuits for each first and second electrode, wherein selectively actuating comprises:
      selectively causing first ones of the line driver circuits to pass the modulated data signal through the first and second electrodes that are connected to outputs of said first ones of the line driver circuits and which do not pass through a region of the touch panel that includes the detected location of the touch; and
      simultaneously selectively causing second ones of the line driver circuits, different from said first ones, to ground the first and second electrodes that are connected to outputs of said second ones of the line driver circuits and which do pass through the region of the touch panel that includes the detected location of the touch.

8. The method of claim 7, wherein the modulated data signal is a wake-up signal.

9. The method of claim 7, wherein the modulated data signal is a synchronization signal.

10. The method of claim 7, wherein using the touch panel to detect the location comprises detecting change in mutual capacitance between the first and second electrodes at locations where the first and second electrodes cross over each other.

11. The method of claim 7, wherein the modulated data signal is generated with respect to a ground reference and wherein selectively causing second ones of the line driver circuits to ground comprises selectively grounding the first and second electrodes to said ground reference.

12. The method of claim 7, further comprising using the touch panel to receive a modulated data signal transmitted by the active stylus device by selectively coupling ones of the first and second electrodes to pass the received modulated data signal to a receive sensor.

13. A system, comprising:
   a touch panel including a plurality of capacitive sensing electrodes; and a touch controller circuit that uses the plurality of electrodes in a first mode of operation to detect a location of a touch made to the touch panel and, in response to the detected location of the touch, then uses the plurality of electrodes in a second mode of operation to generate and transmit a modulated data signal through the touch panel to an active stylus device, wherein the touch controller circuit comprises:
a line driver circuit for each capacitive sensing electrode; and
a control circuit that:
selectively actuates first ones of the line driver circuits to pass the modulated data signal to corresponding first ones of the capacitive sensing electrodes which do not pass through a region of the touch panel that includes the detected location of the touch; and
simultaneously selectively actuate second ones of the line driver circuits, different from said first ones of the line driver circuits, to ground corresponding second ones of the capacitive sensing electrodes which do pass through the region of the touch panel that includes the detected location of the touch.

14. The system of claim 13, wherein the modulated data signal is a wake-up signal.

15. The system of claim 13, wherein the modulated data signal is a synchronization signal.

16. The system of claim 13, wherein the plurality of capacitive sensing electrodes comprises row electrodes.

17. The system of claim 13, wherein the plurality of capacitive sensing electrodes comprises column electrodes.

18. The system of claim 13, wherein the plurality of capacitive sensing electrodes comprises row and column electrodes which cross each other.

19. The system of claim 13, wherein the modulated data signal is referenced to a ground reference and the second ones of the line driver circuits ground the second ones of the capacitive sensing electrodes to said ground reference.

20. The system of claim 13, wherein the control circuit has a ground reference and the second ones of the line driver circuits selectively ground the second ones of the capacitive sensing electrodes to said ground reference of the control circuit.

21. The system of claim 13, wherein the touch controller circuit further uses the plurality of capacitive sensing electrodes in a third mode of operation to receive a modulated data signal transmitted from the active stylus device through the touch panel, the touch controller circuit further comprising:
a receive multiplexer coupled to the capacitive sensing electrodes; and
a receive sensor circuit coupled to an output of the receive multiplexer;
wherein the control circuit further selects ones of the capacitive sensing electrodes to pass the received modulated data signal to the receive sensor circuit.

22. A system, comprising:
a touch panel including plural first electrodes and plural second electrodes, wherein the first and second electrodes cross over each other; and
a touch controller circuit configured in a first mode to detect a location of a touch made to the touch panel and in a second mode to transmit a wake-up signal through the touch panel to an active stylus device, the touch controller circuit comprising:
a line driver circuit for each first and second electrode; and
a transmit multiplexer coupled to each line driver circuit configured to operate in the second mode to:
selectively cause first ones of the line driver circuits to pass the modulated data signal through the first and second electrodes that are connected to outputs of said first ones of the line driver circuits and which do not pass through a region of the touch panel associated with the detected location of the touch; and
simultaneously selectively cause second ones of the line driver circuits, different from said first ones, to ground the first and second electrodes that are connected to outputs of said second ones of the line driver circuits and which do pass through the region of the touch panel associated with the detected location of the touch.

23. The system of claim 22 wherein the touch controller circuit is further operable in a third mode to receive a modulated data signal transmitted from the active stylus device through the touch panel, comprising:
a receive multiplexer coupled to the first and second electrodes; and
a receive sensor circuit coupled to an output of the receive multiplexer;
wherein the receive multiplexer is configured to operate in the third mode to select ones of the first and second electrodes to receive the modulated data signal transmitted from the active stylus device and pass the received modulated data signal to the receive sensor circuit.

24. A system, comprising:
a touch panel including plural first electrodes and plural second electrodes, wherein the first and second electrodes cross over each other; and
a touch controller circuit configured in a first mode to detect a location of a touch made to the touch panel and in a second mode to transmit a synchronization signal through the touch panel to an active stylus device, the touch controller circuit comprising:
a line driver circuit for each first and second electrode; and
a transmit multiplexer coupled to each line driver circuit configured to operate in the second mode to:
selectively cause first ones of the line driver circuits to pass the modulated data signal through the first and second electrodes that are connected to outputs of said first ones of the line driver circuits and which do not pass through a region of the touch panel associated with the detected location of the touch; and
simultaneously selectively cause second ones of the line driver circuits, different from said first ones, to ground the first and second electrodes that are connected to outputs of said second ones of the line driver circuits and which do pass through the region of the touch panel associated with the detected location of the touch.

25. The system of claim 24 wherein the touch controller circuit is further operable in a third mode to receive a modulated data signal transmitted from the active stylus device through the touch panel, comprising:
a receive multiplexer coupled to the first and second electrodes; and
a receive sensor circuit coupled to an output of the receive multiplexer;

wherein the receive multiplexer is configured to operate in the third mode to select ones of the first and second electrodes to receive the modulated data signal transmitted from the active stylus and pass the received modulated data signal to the receive sensor circuit.

* * * * *